United States Patent [19]

Stowe et al.

[11] 4,354,735
[45] Oct. 19, 1982

[54] OPTICAL TRANSDUCER

[75] Inventors: David W. Stowe, Buffalo Grove, Ill.; John D. Christian, deceased, late of Warrenville, Ill.; Albert Christian, heir; Martha R. Christian, heir, both of Indianapolis, Ind.; Ann L. Ziegler, heir, Danville, Ind.; David A. Christian, heir, Indianapolis, Ind.

[73] Assignee: Gould Inc., Rolling Meadows, Ill.

[21] Appl. No.: 106,761

[22] Filed: Dec. 26, 1979

[51] Int. Cl.³ .......................................... G02B 5/172
[52] U.S. Cl. ........................ 350/96.29; 350/96.34; 356/44
[58] Field of Search ............... 350/96.10, 96.29, 96.30, 350/96.34, 320; 340/850; 181/110; 356/44

[56] References Cited

U.S. PATENT DOCUMENTS

| | | | |
|---|---|---|---|
| 3,580,082 | 5/1971 | Strack | 73/705 |
| 3,756,690 | 9/1973 | Borrelli et al. | 350/96.29 X |
| 3,831,137 | 8/1974 | Cuomo | 340/850 |
| 4,068,191 | 1/1978 | Zemon et al. | 331/94.5 M |
| 4,086,484 | 4/1978 | Steensma | 350/96.29 X |
| 4,151,747 | 5/1979 | Gottlieb et al. | 356/44 X |
| 4,162,397 | 7/1979 | Bucaro et al. | 350/96.29 X |
| 4,201,446 | 5/1980 | Geddes et al. | 350/96.29 |

OTHER PUBLICATIONS

Brandt et al., "Bulk Acoustic Wave Interaction with Guided Optical Waves", A.P.L., vol. 23, No. 2, Jul. 1973, pp. 53–54.
Kingsley., "Optical-Fibre Phase Modulator", *Electronics Letters*, vol. 11, No. 19, Sep. 1975, pp. 453–454.
Gfeller et al., "Modulator and Tap for Optical Fiber Systems", *IBM Tech. Discl. Bull.*, vol. 21, No. 5, Oct. 1978, pp. 2014–2015.
Bucaro, "Optical Fiber Acoustic Sensors", *Conference: Fiber Optics Advances in Research & Devel.*, Kingston, R.I., Jun. 1978, pp. 641–655.

*Primary Examiner*—John D. Lee
*Attorney, Agent, or Firm*—Kay H. Pierce; Charles L. Rowe; Edward E. Sachs

[57] ABSTRACT

A transducer (14) including an optical fiber core (15) having a first refractive index profile, and an optical cladding (16) encircling the core and having a second refractive index profile different from that of the profile of the optical core. At least one of the core and cladding is formed of a photoresponsive material providing a variable difference between the refractive indices of the core and cladding as a function of a physical effect applied to the transducer. Light may be propagated through the core from a suitable light source (18) and the light which is lost from the core to the cladding may be detected by a suitable detector (22,23) providing an output signal corresponding to the force applied to the transducer. In one form, the detector receives light from the end (21) of the transducer, and in another form, the detector (23) receives light through the outer surface (24) of the transducer.

7 Claims, 3 Drawing Figures

OPTICAL TRANSDUCER

DESCRIPTION

Technical Field

This invention relates to optical transducers and in particular to optical transducers responsive to a wide range of physical effects.

Background Art

In U.S. Pat. No. 3,831,137 of Frank W. Cuomo, an acousto-optic underwater detector is disclosed comprising a pressure-gradient hydrophone utilizing an optical reflector which is displaced by acoustic waves acting on the hydrophone. The device includes a first group of fiber optic guides transmitting a light beam so as to be incident upon the reflector. The light reflected from the reflector is transmitted by a second group of fiber optic guides to a light detector which detects the displacement of the reflector caused by the acoustic wave impingement thereon so as to cause a change in the intensity of reflected light. The invention contemplates changing the resonant frequency of the detector by utilizing adjustable spring means for mounting the reflector or by varying the mass of the reflector.

Another acousto-optic modulator for optical fiber waveguides is illustrated in U.S. Pat. No. 4,068,191 of Stanley A. Zemon et al wherein the modulator utilizes an optical fiber waveguide in which light is modulated by means of focused acoustic waves. The modulator is formed by encircling a portion of the optical fiber waveguide in an optical communications system with an acoustic transducer arranged so as to focus the acoustic waves inwardly so as to provide high density in the acousto-optic modulation of the optical fiber waveguide.

The concept of causing changes in the light propagation through an optical fiber waveguide by means of an acoustic interaction therewith is further discussed in a number of publications, including ELECTRONIC LETTERS, Vol. 11, No. 19, Sept. 18, 1975, at pp. 453 and 454 thereof, and APPLIED PHYSICS LETTERS, Vol. 23, No. 2, July 15, 1973, at pp. 53 and 54 thereof.

Disclosure of Invention

The present invention comprehends an improved acousto-optic transducer including an optical fiber core having a first refractive index profile and an optical cladding encircling the core and having a second refractive index profile different from that of the optical fiber core. The invention comprehends that at least one of the core and cladding comprise a photoresponsive material for providing a variable difference between the refractive indices of the core and cladding as a function of physical effects applied to the transducer.

More specifically, the transducer is arranged so that the spatial average of the core refractive index profile is only slightly greater than that of the cladding refractive index profile. Thus, light is caused to propagate in the core with effectively minimum loss thereof to the cladding.

The invention comprehends broadly that the construction be such that the refractive indices vary relative to each other as a function of incident vibratory forces such as acoustic forces, steady state forces such as pressure forces, temperature conditions, acceleration forces, magnetic fields, electric fields, etc. applied to the device. Thus, either core, cladding, or both may be formed of photoresponsive material so as to provide the desired refractive index variation.

The transducer is utilized by causing light to be transmitted through the core with detecting means suitably located for detecting the light transferred to the cladding from the core as a result of the applied acoustic field.

In one form, the detecting means may comprise means coupled to the outer surface of the cladding, and in another form, the detecting means is coupled to the end of the transducer.

The invention further comprehends the provision of a method of forming such acoustic optic transducers wherein the transducers are formed as a continuous clad core which is separated into discrete lengths defining the individual transducers.

Increased sensitivity in the acoustic-optic transducer may be provided by decreasing the difference in the indices of refraction between the core and cladding as desired.

The transducer may be made to have an extremely small diameter.

The acoustic-optic transducer of the present invention is extremely simple and economical of construction while yet providing a highly improved transducer for use as a hydrophone and the like.

BRIEF DESCRIPTION OF THE DRAWING

Other features and advantages of the invention will be apparent from the following description taken in connection with the accompanying drawing wherein.

BEST MODE FOR CARRYING OUT THE INVENTION

Figure 1:
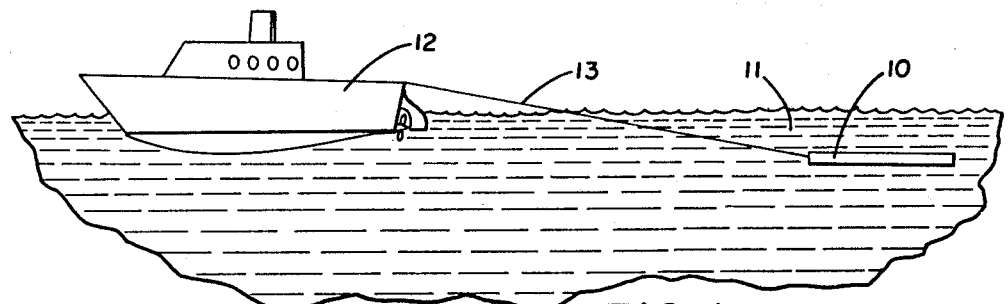
FIG. 1 is a fragmentary view illustrating the use of a hydrophone having an acousto-optic transducer comprising the invention.

In the exemplary embodiment of the invention as disclosed in the drawing, a hydrophone generally designated 10 is shown for use in detecting sound in a body of water 11. Illustratively, the hydrophone may be dragged from a suitable marine vehicle 12 by means of a tow line 13 and, illustratively, may be used in geophysical exploration, etc.

Figure 2:
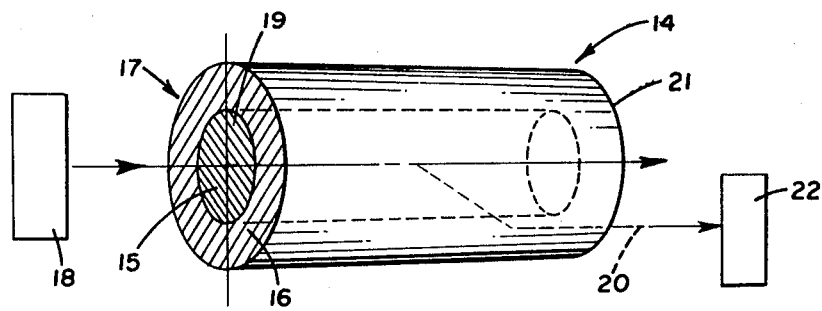
FIG. 2 is a schematic diagram isometrically illustrating the transducer.
Figure 3:
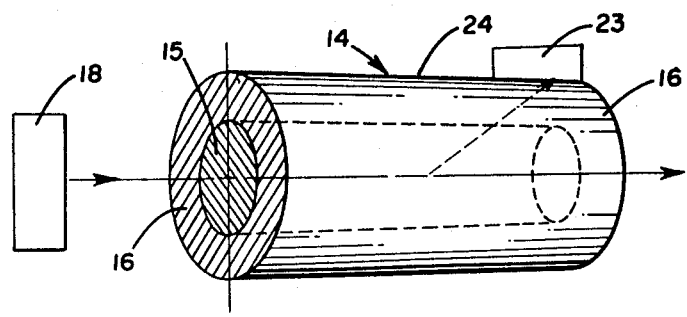
FIG. 3 is a view similar to that of FIG. 2 but illustrating a modified form of detection therewith.

Hydrophone 10 utilizes an acousto-optic transducer generally designated 14 as more specifically illustrated in FIGS. 2 and 3. Transducer 14 is extremely simple and economical of construction utilizing a light-transmitting optical fiber core 15 and a light-transmitting cladding 16 surrounding the core. Thus, the transducer effectively defines an optical fiber generally designated 17.

The invention broadly comprehends that at least one of the core and cladding be formed of a suitably active material, the refractive index of which varies as a function of an applied physical effect. Resultingly, transfer of light from the core to the cladding is a sensitive function of physical effects applied to the transducer.

The physical effects which may be selectively utilized for modulating the light in the transducer may illustratively include steady state forces, vibratory forces including acoustic forces, temperature conditions, acceleration forces, magnetic fields, electric fields, etc.

Where the physical effect utilized is one producing a mechanical strain, the photoresponsive material may comprise an elastic material, such as glass.

Where the physical effect utilized is thermal, the thermally responsive active material may comprise a glass having a high refractive index versus temperature coefficient, such as Corning code 7490 glass.

One example of a magneto-optically active material which may be used for at least one of the components is Corning 7363 lead glass. A transducer utilizing such material may be responsive to magnetic field effects acting thereon or to current passed therethrough for providing a magnetic variation therein and resultingly produce a corresponding change in the index of refraction profile.

In the use of the transducer, a light-transmitting means 18 is disposed to transmit light into one end 19 of the transducer to be conducted longitudinally through the core. It is desirable that light be confined only to the core at the input to the transducer region. A mode stripper may be utilized at the input to the transducer region to remove any stray scattered light which may have entered the cladding prior thereto. Random distortions of the core (mode scrambling) may be provided at the input to the transducer region to distribute light through all possible modes of the core, thus assuring that there is some light in the modes which couple most readily to the cladding.

Core 15 may have a first refractive index profile $N_1$ and cladding 16 may have a second, different refractive index profile $N_2$. In the conventional optical fiber, the spatial average value of the refractive index of the core is greater than the spatial average value of the refractive index of the cladding whereby light propagates through the core with effective minimum loss to the cladding.

In the illustrated invention, at least one of the core and cladding materials is formed of the photoresponsive material, so that, as a result of a pressure force applied to the transducer, the difference between the refractive indices of the core and cladding will vary relative to each other. Illustratively, where the force applied to the transducer comprises an acoustic pressure, the difference in refractive indices will vary in accordance with the time function of the acoustic field.

The transfer of light from the core to the cladding is a sensitive function of the difference in the refractive indices and, thus, a sensitive correlation of the applied acoustic field to the light transferred to the cladding is obtained.

As shown in FIG. 2, the transferred light 20 may pass longitudinally through the cladding to the opposite end 21 of the transducer so as to be detected by a suitable light detector 22.

As will be obvious to those skilled in the art, the light detector will thusly detect a light signal accurately corresponding to the physical effect, such as the acoustic field, applied to the transducer. As the transducer provides an extremely sensitive transfer of light from the core to the cladding, an extremely sensitive detection may be effected by the detector 22.

As will be obvious to those skilled in the art, the variation in light signal detected by detector 22 may comprise a steady state variation caused by steady state physical effects such as an increase in the static pressure applied to the transducer, or alternatively, may comprise a variable signal corresponding to vibratory physical effects such as produced by an acoustic, electrical, magnetic, etc. field applied to the transducer.

The detected signal may be transferred, as desired. Illustratively, the signal may be carried back to vehicle 12 through suitable conductors in tow line 13.

The cross-sectional dimensions of the transducer may be made extremely small. More specifically, the transducer cross-sectional dimensions may be made substantially smaller than those of conventional mechanical modulation devices.

The invention comprehends that the detector may alternatively comprise a detector such as detector 23 which is coupled to the outside surface 24 of the cladding 16, as illustrated in FIG. 3. As will be obvious to those skilled in the art, such coupling may be readily effected by use of a coupling fluid having an index of refraction matching that of the cladding 16 in the detector 23.

As shown in FIGS. 2 and 3, the transducer effectively comprises a discrete cylindrical element. Illustratively, the transducer may be formed by forming a continuous clad core optical fiber of the desired materials and separating the continuous clad core into discrete lengths defining the individual transducers. As will be obvious to those skilled in the art, any desirable difference in the refractive index profiles of the materials forming the core and cladding may be utilized as desired within the scope of the invention. Further, as will be obvious to those skilled in the art, variations in the construction of the transducer may be provided in the relative dimensions of the core and cladding. Still further, as will be obvious to those skilled in the art, variations in the photoresponsive constants of the active means of the transducer may be utilized within the scope of the invention, as desired. Thus, a wide range in the construction, sensitivity, and other characteristics as desired may be obtained through suitable selection of the desired parameters.

The manufacture of the transducer by continuous process discussed above provides an extremely low cost manufacture.

Industrial Applicability

As indicated above, the optical transducer of the present invention may be utilized advantageously as a hydrophone acoustic detector device.

As will be obvious to those skilled in the art, the transducer may be utilized in a wide range of applications wherein it is desired to detect steady state changes or time variable signals, such as acoustic fields.

As will be further obvious to those skilled in the art, the invention comprehends the utilization of the transducer with any suitable input physical effect capable of effecting the desired change in the relative refractive indices of the materials of the constituent components of the transducer. However, as discussed above, the invention is advantageously adapted for applications wherein the force transfer is through a surrounding fluid medium.

A substantial transfer of light from the core to the cladding may be effected in the transducer, such as approximately 50% thereof in the absence of the physical effect, whereby the amount of depletion of the core light may be detected alternatively or cumulatively to detection of the amount of light in the cladding, as illustrated by the use of detector 22 in FIG. 2.

We claim:

1. In an optical transducer (14) including an optical fiber core (15) having a first refractive index profile, and an optical cladding (16) encircling said core and having a second refractive index profile different from that of said optical core, the improvement comprising
  at least one of said core and cladding being formed of a suitable photoresponsive active material, the refractive index of which varies as a function of an applied electromagnetic field for providing a variable difference between the refractive indices of said core and cladding as a function of said applied electromagnetic field applied to said transducer, thereby to variably couple light from the core to the cladding in accordance with said applied electromagnetic field.

2. An optical transducer of claim 1 further comprising means for detecting light variably coupled from said core to said cladding in accordance with said applied electromagnetic field.

3. An optical transducer of claim 2, wherein said means for detecting light comprises means coupled to the transverse outer surface of said cladding.

4. An optical transducer of claim 2, wherein said means for detecting light comprises means coupled to an end surface of said cladding.

5. In an optical transducer (14) including an optical fiber core (15) having a first refractive index profile, and an optical cladding (16) encircling said core and having a second refractive index profile different from that of said optical core, the improvement comprising:
  at least one of said core and cladding being formed of a suitable photoresponsive material for providing a variable difference between the refractive indices of said core and cladding as a function of an electromagnetic field applied to said transducer, thereby to variably couple light from the core to the cladding in accordance with said applied electromagnetic field;
  means (18) for transmitting light through said core; and
  means (22) for detecting the amount of decrease in the light propagated through said core (15) as a result of coupling of light therefrom to said cladding (16).

6. The optical transducer of claim 5 wherein said detecting means comprises means (23) coupled to an end surface of said cladding.

7. The optical transducer of claim 5 wherein approximately 50% of the light propagated in the core is transferred to said cladding in the absence of said applied electromagnetic field.

* * * * *

UNITED STATES PATENT AND TRADEMARK OFFICE
CERTIFICATE OF CORRECTION

PATENT NO. : 4,354,735
DATED : October 19, 1982
INVENTOR(S) : David W. Stowe et al.

It is certified that error appears in the above-identified patent and that said Letters Patent is hereby corrected as shown below:

Column 2, lines 17 and 23, "acoustic" to read -- acousto --.

Signed and Sealed this

First Day of February 1983

[SEAL]

Attest:

GERALD J. MOSSINGHOFF

Attesting Officer      Commissioner of Patents and Trademarks